United States Patent Office 3,455,990
Patented July 15, 1969

3,455,990
DERIVATIVES OF CYCLOPENTANETETRA-CARBOXYLIC ACID
Barry David Jones, and James Christopher Phillips Sly, Tonbridge, Kent, England, assignors to Bridge Chemicals Limited, Hertfordshire, England, a British company
No Drawing. Filed Dec. 1, 1965, Ser. No. 510,974
Claims priority, application Great Britain, Dec. 11, 1964, 50,640/64
Int. Cl. C07c *133/02*
U.S. Cl. 260—468  6 Claims

ABSTRACT OF THE DISCLOSURE

Polyhydrazide derivatives of cis-cyclopentanetetracarboxylic acid are prepared by reacting lower alkyl esters of cyclopentanetetracarboxylic acid with appropriate quantities of a source of hydrazine. The compounds prepared have at least two hydrazide groups and are useful as blowing agents and herbicides.

---

This invention relates to novel derivatives of cyclopentanetetracarboxylic acid and to their manufacture.

Although 1,2,3,4 - cyclopentanetetracarboxylic acid (hereinafter abbreviated to CPTCA) has six possible geometric configurations, which may be referred to as the cccc (or all-cis), ctcc, cttc, cctt, tccc and ctct forms (where c represents cis and t represents trans), the present invention is concerned only with derivatives of the all-cis form of CPTCA.

The derivatives of CPTCA with which the invention is concerned are the hydrazides represented by the general formula:

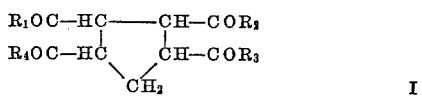

wherein $R_1$, $R_2$, $R_3$ and $R_4$ represent NH—$NH_2$ or OR, where R represents a hydrocarbon group containing up to 12 carbon atoms, preferably an aliphatic group, for example an alkyl group, the values of $R_1$, $R_2$, $R_3$ and $R_4$ being such that at least two of them are NH—$NH_2$.

The compounds of Formula I may be prepared by reacting a tetra-ester of CPTCA of the general formula:

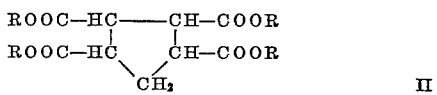

wherein R has the same meaning as in Formula I, with an appropriate amount of hydrazine depending on whether the tetra-, tri- or di-hydrazide is required. The reaction is preferably carried out in the presence of water and/or an organic solvent, for example methanol, ethanol or dimethyl formamide. The hydrazine may, if desired, be used in the form of hydrazine hydrate.

In copending U.S. application Ser. No. 471,414 filed July 12, 1964 by Sly, Hansell and Flavell, there is described the preparation inter alia of some tetra-esters which may be employed in preparing the compounds of the present invention.

The compounds of the invention are useful as blowing agents. They may also be of use as herbicides.

The following exaamples illustrate the invention.

Example 1

The tetramethyl ester of all-cis CPTCA (30.2 g.), referred to in Chem. Ber. 87, 1752–9, 1954, was mixed with ethanol (250 ml.) and 40% w./w. aqueous hydrazine (37.5 g.). The resulting mixture was heated under reflux for 5½ hours and was then cooled, filtered and the precipitate dried to give the tetra-hydrazide of all-cis CPTCA (20 g.).

Example 2

The tetramethyl ester of all-cis CPTCA (30.2 g.) was mixed with 40% w./w. aqueous hydrazine (35.2 g.) and the mixture was heated under reflux for 2 hours. It was then cooled, filtered and the precipitate dried to give the tetra-hydrazide of all-cis CPTCA (23 g.).

Example 3

The tetramethyl ester of all-cis CPTCA (3.02 g.) was mixed with dimethyl formamide (10 ml.) and hydrazine hydrate (2.2 g.). The mixture was heated at 90°–95° C. for 2 hours. It was then cooled and filtered, and the precipitate was washed with hot ethanol and then dried to give the tetra-hydrazide of all-cis CPTCA (1.7 g.).

Example 4

A solution of the tetramethyl ester of all-cis CPTCA (3.02 g.) in methanol (20 ml.) was added dropwise to refluxing hydrazine hydrate (10 ml.) over 45 minutes. The resulting mixture was heated under reflux for a further hour and was then cooled, filtered and the precipitate washed with hot methanol to give the tetra-hydrazide of all-cit CPTCA (2.61 g.).

Example 5

The tetramethyl ester of all-cis CPTCA (7.55 g.) was mixed with methanol (100 ml.) and hydrazine hydrate (3.75 g.) and heated at reflux for 6 hours. Some of the methanol was removed by distillation and the resulting solution was then cooled and filtered to give the trihydrazide monomethyl ester of all-cis CPTCA (2.5 g.).

Example 6

The tetramethyl ester of all-cis CPTCA (75.5 g.) was mixed with methanol (200 ml.) and hydrazine hydrate (25 g.) and heated at reflux for 4 hours. It was filtered hot and the filtrate cooled to 0° C. The solid formed was filtered off to give the dihydrazide dimethyl ester of all-cis CPTCA (28.6 g.).

We claim:
1. Hydrazides of all-cis 1,2,3,4-cyclopentane-tetracarboxylic acid represented by the general formula:

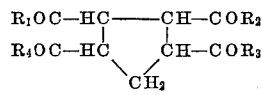

wherein $R_1$, $R_2$, $R_3$ and $R_4$ represent NH—$NH_2$ or OR, where R represents a hydrocarbon group containing up to 12 carbon atoms, the values of $R_1$, $R_2$, $R_3$ and $R_4$ being such that at least two of them are NH—$NH_2$.

2. Hydrazides as claimed in claim 1, wherein R represents an aliphatic group.

3. Hydrazides as claimed in claim 1, wherein R represents an alkyl group.

4. A hydrazide as claimed in claim 1, wherein $R_1$, $R_2$, $R_3$ and $R_4$ each represent $NH-NH_2$.

5. A hydrazide as claimed in claim 1, wherein one of $R_1$, $R_2$, $R_3$ and $R_4$ is methoxy and the remainder are each $NH-NH_2$.

6. A hydrazide as claimed in claim 1, wherein two of $R_1$, $R_2$, $R_3$ and $R_4$ are methoxy and the remaining two are $NH-NH_2$.

References Cited

UNITED STATES PATENTS 2,816,897  12/1957  Wolf _____ 260—326
3,346,598  10/1968  Volkenburgh et al. __ 260—346.3

LORRAINE A. WEINBERGER, Primary Examiner

PAUL J. KILLOS, Assistant Examiner

U.S. Cl. X.R.

260—557; 71—106, 118